Dec. 15, 1953

D. E. SULLIVAN 2,662,392

SINE WAVE SHOCK TESTER

Filed Feb. 3, 1950

Inventor
D. E. SULLIVAN
By M. C. Hayes
Attorney

Dec. 15, 1953

D. E. SULLIVAN 2,662,392

SINE WAVE SHOCK TESTER

Filed Feb. 3, 1950

Inventor
D. E. SULLIVAN
By M. C. Hayes
Attorney

Dec. 15, 1953     D. E. SULLIVAN     2,662,392
SINE WAVE SHOCK TESTER

Filed Feb. 3, 1950     3 Sheets-Sheet 3

Inventor
D. E. SULLIVAN

By

Attorney

Patented Dec. 15, 1953

2,662,392

UNITED STATES PATENT OFFICE 2,662,392

SINE WAVE SHOCK TESTER

Donal E. Sullivan, Washington, D. C.

Application February 3, 1950, Serial No. 142,245

6 Claims. (Cl. 73—12)

(Granted under Title 35, U. S. Code (1952), sec. 266)

This invention relates generally to test devices and more particularly to shock testers of the type adapted to apply controlled acceleration shock to apparatus under test for producing therein a shock wave sinusoidal in character.

The expense and delay inherent to field testing of ordnance materials and the difficulties incurred in controlling the many variables arising therefrom has led to extensive development of laboratory test apparatus suitable for applying to such apparatus under test control shock conditions comparable in substantially every respect to those encountered by such apparatus in service use.

It has been found, however, that in order to effectively cover the wide range of laboratory shock applications required for testing the numerous and distinctively different types of ordnance devices, several likewise distinctly different types of test apparatus must be provided, each form thereof being effective to produce in the test device certain of the shock effects more exactly corresponding to those to which the particular device is subjected during its use.

The shock tester of the present invention provides for producing in apparatus under test a shock wave of a particular pattern corresponding to a sine wave and wherein the character of the wave pattern may be varied selectively by controlling independently the period of acceleration and the rate of velocity change as applied to the particular part under test.

It is an object of the present invention to provide a new and improved shock testing device adapted to produce in an object under test a shock pattern sinusoidal in character.

It is a further object of the present invention to provide a new and improved acceleration shock testing device wherein a sinusoidal shock pattern produced thereby may be varied selectively by controlling independently the period of acceleration and rate of velocity change as applied to the part under test.

Other objects and many of the attendant advantages of this invention will be readily appreciated as the same becomes better understood by reference to the following detailed description when considered in connection with the accompanying drawings wherein.

Figure 1:
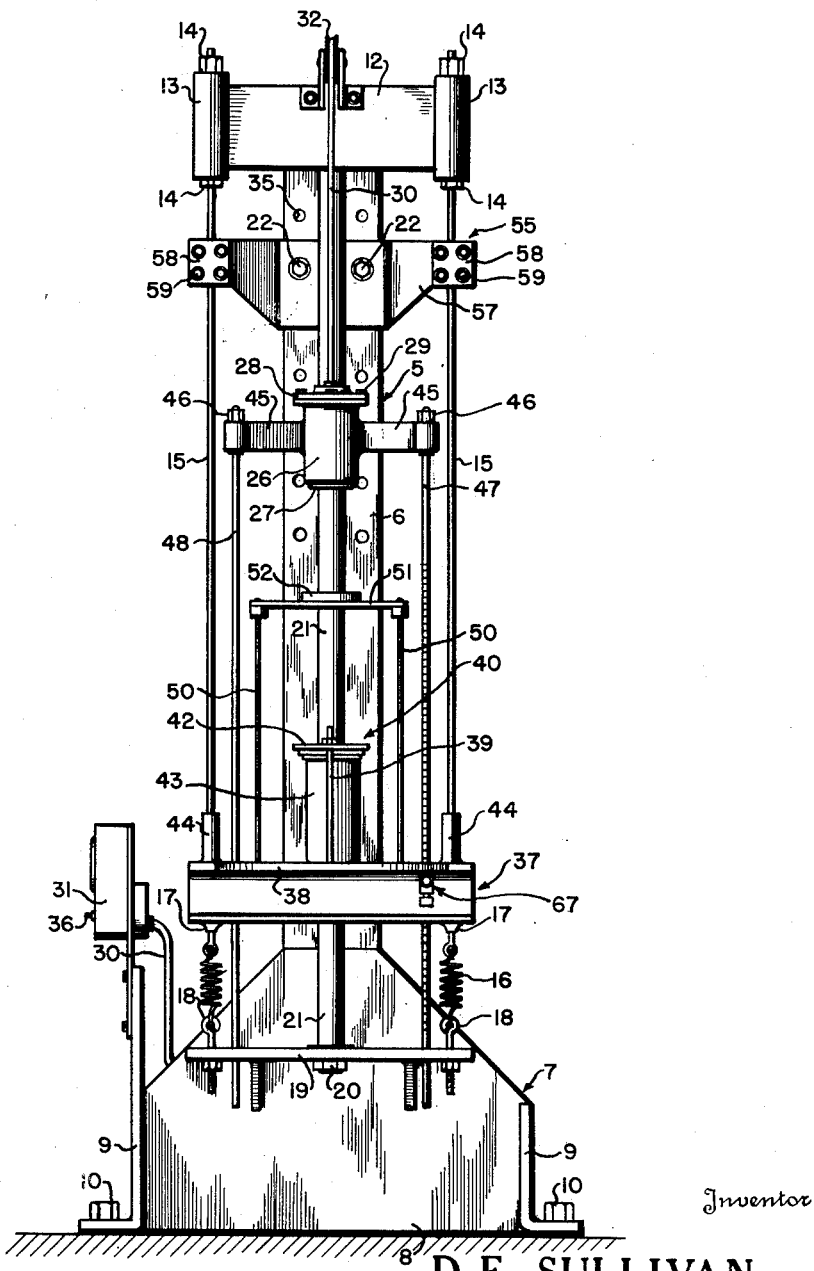
Fig. 1 is a front view in elevation of a preferred embodiment of the shock tester of the present invention.

The shock tester of the present invention is comprised of a frame structure generally designated 5 and including an I-beam member 6 vertically supported from a base structure generally designated 7 and including a stand plate 8 secured as by welding to the forward face of the beam. A pair of angular brackets 9 are secured as by welding to plate 8 and are provided with suitable openings for receiving bolts 10 for securing the frame to any suitable base support therefor.

Figure 2:
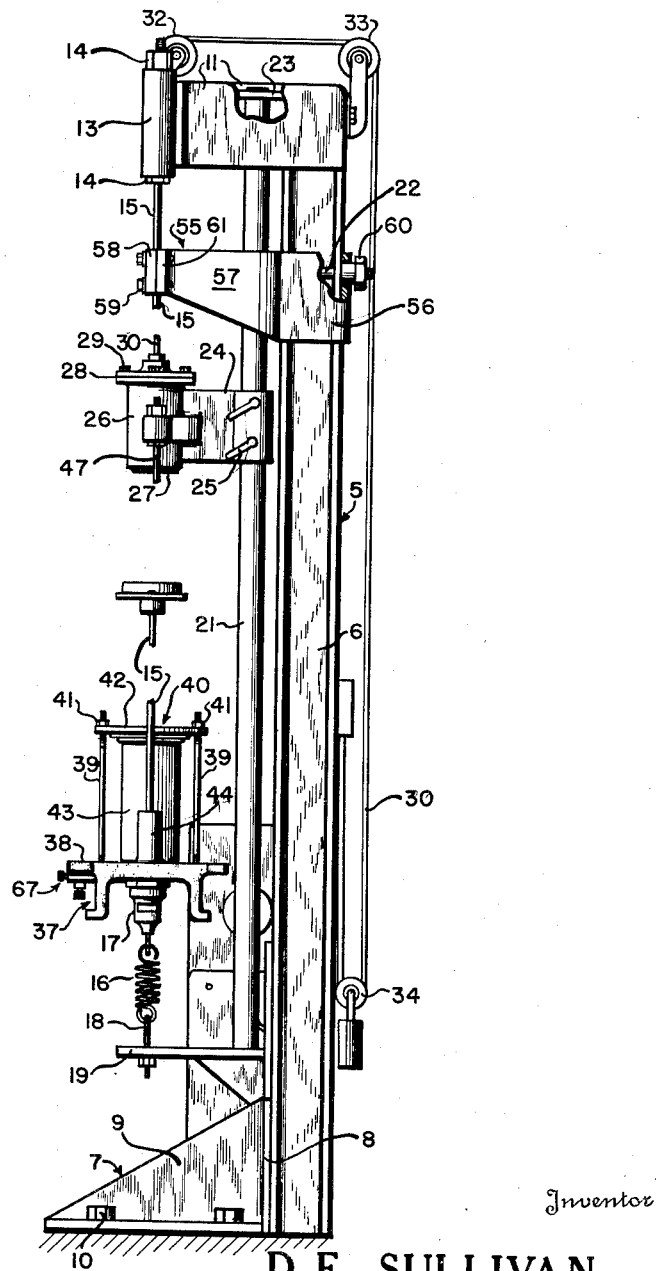
Fig. 2 is a side view of the embodiment of the shock tester shown in Fig. 1.

Arranged adjacent the upper end of beam 6, Fig. 2, is a pair of horizontal plate members 11 secured as by welding to the side edges of the beam and arranged to extend forwardly therefrom for connection with a cross plate 12, Fig. 2, adapted to support from the ends thereof a pair of cylindrical-like members 13 which preferably are welded or otherwise suitably secured thereto.

Secured within the cylinders 13, as by nuts 14, is a pair of depending tension rod members 15 which are movably secured at their lower ends by springs 16. These springs extend between stop nuts 17 threaded with the lower ends of the rods and eyebolts 18 projecting upwardly from a forwardly extending plate 19 secured as by welding to the forward face of the stand plate 8.

Rising from plate 19, to which it is secured as by nut 20, is a shaft section 21 arranged parallel to the beam 6, the upper end of the shaft being received within an opening provided therefor, but not shown, in a crossplate 23 which preferably is welded at its ends to the plates 11 respectively.

Movable vertically upon the shaft 21, Fig. 2, is a bracket structure 24 adapted for being secured in selected positions of adjustment upon the shaft as by clamp screws 25, the bracket including an annular housing-like portion 26 wherein is arranged an electro-magnet assembly 27 of which a part thereof projects outwardly from an opening provided therefor in the lower end of the housing.

The magnet 27 is admitted to the housing through an opening provided therein and now shown closed as by cap-piece 28 secured to the housing as by bolts 29. An electrical conductor cable 30 extending outwardly through an opening provided therefor in the cap-piece and thereafter passing to a control panel 31 by way of pulleys 32, 33 and 34, is effective to supply current for energizing the electro-magnet 27 as a switch 36 on the panel 31 is closed.

Movable over the rods 15 is a carriage structure generally designated 37 and including a face plate portion 38 tapped and threaded at various positions thereon, not shown, for receiving therein the threaded end portions of rods 39 forming a part of a clamp assembly generally designated 40 and adapted, as nuts 41, threaded with the upper ends of the rods, are tightened to draw downward a spanning plate 42 for pressing to the face of the carriage the part 43 to be tested.

Extending upwardly from the face of the carriage and preferably formed integral therewith is a pair of tubular guides 44 adapted to closely receive therein the rods 15 whereby the position of the face plate 38 of the carriage is maintained in a plane perpendicular to the rods as the carriage is moved vertically thereon, as will become more fully apparent as the description proceeds.

Secured to and preferably forming an integral part of the bracket structure 24 is a pair of outwardly extending arm sections 45 wherein is secured as by nuts 46 a pair of depending rod members 47 and 48 adapted for being loosely received within openings provided therefor, but not shown, within the carriage and plate members 37 and 19 respectively, the rods moving vertically within these openings as adjustments are made in the position of the bracket 24 upon the shaft 21.

Secured to and extending upwardly from the base of the carriage is a pair of rod members 50 adapted to support thereon in spaced relation to the carriage a cross plate 51 whereon is secured in any suitable manner an annular plate 52 of magnetic material such, for example, as mild steel, and adapted as the carriage is lifted along the rods 47, 48, and 15 to engage the lower end of the magnet 27 and thereby, when the latter is energized, to magnetically connect with the magnet to support in an elevated position the carriage 37 above the stop nuts 17 secured as indicated to the ends of the rods 15.

Figure 4:
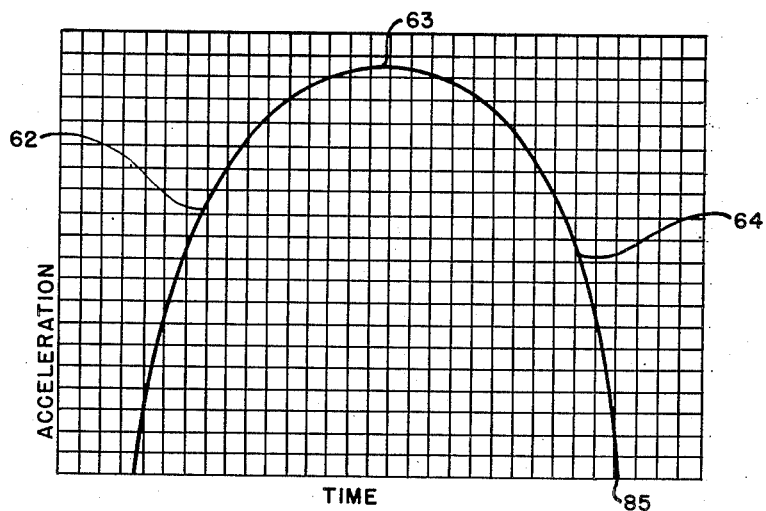
Fig. 4 is a graph showing an example of a sinusoidal shock pattern or shock wave produced by the tester.

In order to effectively regulate the spring length of the rods 15 and thereby to accordingly regulate the particular shock pattern to be produced in the test part, sections of the rods 15 may be clamped to the beam 6, as by a bracket structure 55, in such a manner as to render a portion of the rods ineffective in response to the impact of the carriage 37 upon the nuts 17 and thereby to selectively alter the resilient character of the rods 15 and the characteristics of the sine wave illustrated in Fig. 4.

The bracket 55, provided for securing the rods 15 to the beam 6, is comprised of a U-shaped member 56, Fig. 2, loosely arranged about the beam to connect as by welding to the rear face of an angular plate member 57 disposed against the forward face of the beam, the entire bracket assembly thereafter being clamped to the forward face of the beam by bolts 22 extending through a pair of a plurality of openings 35 provided therefor in the beam. The heads of the bolts are drawn to the bracket to compress it to the forward face of the beam as by shoulder nuts 60 which are arranged in the manner indicated in Fig. 2 for cooperation with the bolts 22.

The angular plate 57 of the bracket is provided with outwardly extending arm sections 61 to which plates 58 are secured as by bolts 59, for clamping the rods 15 to the bracket in an obvious manner as the bolts are tightened. In order that a more effective engagement may be had between the bracket 55 and rods 15, the rods 15 may be threaded in any suitable manner for connecting with half round threaded sections provided therefor, but not shown, within the forward face of the bracket and plate members 57 and 58 respectively, the threaded surfaces of the members interlocking to establish a gripping engagement therebetween.

With reference now to the operation of the device thus far described, it will first be understood that prior to the securing of the test part to the carriage 37, as by the clamping bracket 40, the desired characteristics of the shock to be applied to the test part is first determined and the position of the bracket 24 on shaft 21 and the length of the spring rods 15 are accordingly adjusted sufficiently, in the manner heretofore set forth, to provide the desired shock characteristics. After the proper securing of the test part of the carriage base, the carriage is thereupon lifted to the position for allowing the plate 52 supported thereon from the rods 50 to connect with the under face of the magnet 27 which is now energized by the closing of the switch 36.

The releasing of the carriage is accomplished by reversal of the polarity of the magnet 27, from the control panel 31, it being understood that suitable apparatus, not shown, is contained therein for reversing the polarity upon manipulation of the switch 36. Polarity reversal preferably is provided in order to eliminate the restraining force due to residual magnetism in the magnet 27 and plate 52, thereby to obtain free fall of the carriage at the acceleration of gravity. The carriage is thus allowed to fall free of the magnet to accelerate downwardly along the tension rods 15 at a rate of velocity change predetermined for the particular test effects to be obtained.

As the carriage strikes the stop nuts 17, this being at a velocity controlled by the distance of free fall of the carriage, the spring rods 15 are momentarily elongated and thereafter contract to accelerate the carriage upwardly along the rods 47, 48 and 15. The carriage is secured at the crest of this rise by a latch assembly generally designated 67, Fig. 3.

The movement of the test part and carriage in the foregoing manner produces therein a shock wave corresponding to the sine curve shown in the graph of Fig. 4. The first half portion 62 of the curve indicates the rate of change in velocity or acceleration of the carriage during elongation of the rods, the velocity being zero at maximum elongation of the rods which condition is indicated at point 63 in the curve. The last half portion 64 of the curve represents the rate of change in velocity as the rods 15 contract.

Figure 3:
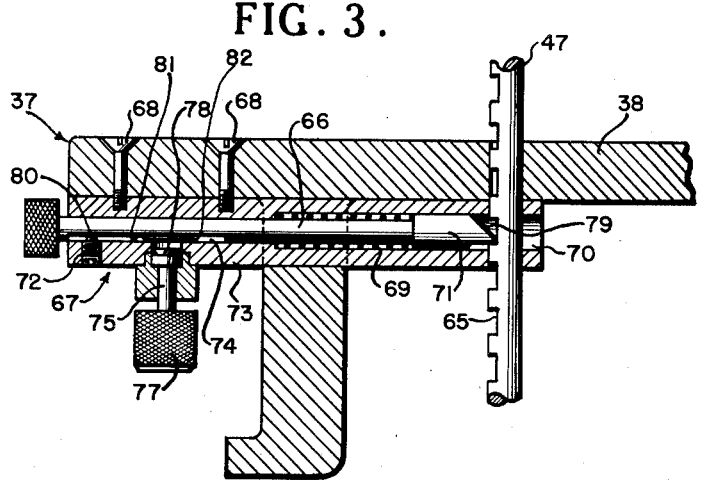
Fig. 3 is a view partly in section and partly in elevation through the latch assembly of the invention.

In order to prevent secondary shock by the carriage returning for a second time to the stop nuts 17, there is provided in the rod 47 a plurality of spaced notches 65, Fig. 3, adapted for being engaged by a plunger 66 forming a part of latch assembly generally designated 67 and secured as by screws 68 to the underface of the carriage plate 38. The plunger 66 is urged in the direction of the rod 47 by spring 69 arranged thereover and initially compressed between the base of a counterbore 70 and the plunger head 71. Orientation of the plunger 66 with respect to the notches 65 in the rod 47 is maintained by a stud screw 72 threaded with the under surface of the latch housing 73 and having the shank portion 80 thereof projecting upwardly into a notch keyway 81 formed in the undersurface of the plunger 66.

In order that interference with the rod 47 by the latch may be prevented during the interval of fall of the carriage following its release from the magnet 27, the plunger 66 is initially maintained in a retracted position by engagement of a notch portion 74 therein with a second plunger 75. Plunger 75 has an inverted conical end portion 78 which cooperates with a similarly formed surface 82 of notch 74 to lock plunger 66 in the retracted position. This is accomplished by manual withdrawal of the plunger 66 followed by raising of plunger 75 into engagement with the notch 74 where it is retained by the urge of the spring 69 against the plunger 66. Upon impact of the carriage with the nuts 17, the plunger 75, by reason of the weighted end portion 77 thereon, is accelerated downwardly by inertia to free the end portion 78 thereof from the notch 74 of plunger 66, thereby allowing the plunger 66 to be extended to connect with the rod 47. Upon upward movement of the carriage responsive to contraction of the rods 15, the plunger 66, by reason of the inclined surface 79 thereon, is caused to skip the notches 15 to thereafter become seated in one of the notches as the upward motion of the carriage ceases, thereby to secure the carriage to the rod in an elevated position thereon and so prevent secondary shock effects being applied to the test part by the return of the carriage to the nuts 17.

From the foregoing, it will now be apparent that the aforedescribed apparatus is adapted to produce a shock wave similar to the sine curve illustrated in Fig. 4, it being understood that the particular period of acceleration and velocity change characteristics for a specific shock pattern desired being controlled or predetermined by the aforementioned adjustment, or combination of adjustments, of the apparatus. For example, in certain cases, vertical adjustment of the magnet assembly only may be sufficient to provide the desired characteristics; in other cases a change in the effective length of rods 15 may be sufficient. In some cases, depending on the weight of the object under test, in addition to, or in lieu of, the foregoing adjustments, it may be necessary to add weight to the carriage and/or to change the diameter of rods. In any case, it will be understood that the elastic limit of the rods 15 must not be exceeded if the sine wave characteristics of the shock pattern are to be developed and applied to the part under test.

Stated briefly in summary, the present invention contemplates a shock testing apparatus wherein the object under test is released for free fall at the acceleration of gravity through a distance sufficient to strike a yieldable energy storing means having a predetermined spring rate at a predetermined velocity whereby the object is decelerated downwardly at a predetermined rate of velocity change to a position of rest as the kinetic energy of the object is transferred to the storage means and thereafter is accelerated upwardly at a predetermined velocity change as the stored energy is released from the storage means, the rate of velocity change during the aforesaid downward and upward shock movements corresponding to a sine wave.

When the energy is released from the storage means, represented hereinbefore as the rods 15 for purposes of illustration, contraction of the rods ceases whereupon the carriage and test part thereon move upwardly solely by the momentum thereof as the carriage moves away from the nuts 17, this point of separation being represented in the curve of Fig. 4 at point 85 therein.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A shock producing device of the character disclosed for imparting sine wave motion to an object under test comprising, in combination, a frame, a multiplicity of yieldable tension members depending vertically from a portion of said frame, stop means fixedly secured to the depending ends of said tension members, a carriage normally to come to rest on said stop means and movable on said tension members and adapted to support thereon an object to be tested, an electro-magnet arranged when energized to support said carriage in an elevated position on said tension members, means for energizing and subsequently reversing the polarity of said electro-magnet to respectively support and subsequently release said carriage for free accelerated motion thereof by gravity along said tension members into impact with said stop means whereby said tension members are yieldably extended and the reaction thereof accelerates said carriage upwardly on said tension members, thereby producing in said object a sinusoidal shock pattern, and means for latching said carriage at the peak of its rise on said tension members.

2. A shock applying device of the character disclosed for imparting sine wave motion to an object under test comprising, in combination, a frame structure, a pair of yieldable tension members depending vertically from a portion of said frame structure, stop members fixedly secured to the depending ends of said tension members, a carriage normally to come to rest on said stop members and slideably movable over said tension members and adapted to support thereon the part to be tested, means for securing said carriage in an elevated position on said tension members, means for releasing said carriage to accelerate by gravity along said members into impact with said stop members thereby to yieldably extend said tension members sufficiently so that subsequent contraction thereof accelerates said carriage vertically upward on said tension members in a manner to produce in the test part a sinusoidal shock wave having predetermined time-velocity change characteristics, and means for latching said carriage at the crest of its rise on said tension members.

3. A shock tester of the character disclosed for subjecting a part to be tested to a sinusoidal shock wave including, in combination, a frame, a multiplicity of yieldable tension members depending vertically from a portion of said frame, a plurality of stop members respectively secured to the depending ends of said tension members, a carriage normally to come to rest on said stop members and adapted to support thereon said part to be tested, means for suspending the carriage above said stop members, means for releasing said carriage to allow the carriage and said part supported thereon to accelerate into yielding impact with said stop members thereby to extend said yieldable tension members to begin said sinusoidal shock wave upon said impact, said tension members having sufficient recoil to reverse the direction of acceleration of said carriage and part thereon and to cause accelerated upward movement thereof sufficient to produce in said test part a sinusoidal shock wave until said recoil is terminated, and means for arresting said carriage at the peak of the upward movement thereof.

4. A sine wave shock tester of the character disclosed comprising, in combination, a carriage adapted to support thereon a part to be shock tested, means including a frame for suspending said carriage in an elevated position, means for releasing said carriage to allow downward accelerated motion of said carriage responsive to gravity, a plurality of yieldable tension members depending vertically from said frame, a plurality of stop members secured respectively to the depending ends of said tension members and arranged to be engaged by said carriage for arresting the downward movement thereof and reversing the direction of acceleration of the carriage at the completion of its downward stroke, said tension members having sufficient elasticity to impart predetermined sinusoidal velocity changes to the carriage and part thereon during the successive downward and upward movements thereof, and means for arresting motion of said carriage at the completion of its upward movement.

5. A shock testing device of the character disclosed for imparting sine wave motion to an object to be tested comprising, in combination, a support, a plurality of yieldable tension rod members vertically suspended from said support, stop means fixedly secured to the depending ends of said rod members, a carriage normally to come to rest on said stop means and disposed for vertical movement along said rods and having said object secured thereto for movement therewith, means vertically adjustable for securing said carriage in an elevated position on said rods, means for releasing said carriage to allow accelerated motion thereof downwardly along said rod into impact with said stop means to momentarily elongate said rods and thereafter to accelerate said carriage vertically upward responsive to the contraction of said elongated rods, means for latching said carriage at the completion of its upward motion, and means for adjustably changing the effective length of said rods for controlling the characteristics of said sine wave motion applied to said test object and the carriage.

6. A shock testing device of the character disclosed for imparting sine wave motion to an object to be tested comprising, in combination, yieldable tension rod means dependingly arranged for elongation and contraction in a vertical plane in accordance with sine wave motion and having stop means at the lower ends thereof, means for releasably suspending the object above said stop means, means for releasing the object from said suspending means for free fall at the acceleration of gravity into engagement with said stop means whereby the tension rod means are yieldably elongated upon further fall of the object, said tension rod means having a spring rate sufficient to store the potential energy of said object therein whereby downward movement of the object is arrested upon predetermined elongation of the tension rod means and whereby the object is forced to rise thereby as said stored energy is released upon contraction of the tension rod means, and means for latching the object at the top of the rise thereof.

DONAL E. SULLIVAN.

References Cited in the file of this patent

UNITED STATES PATENTS

| Number | Name | Date |
|---|---|---|
| 1,809,347 | Martin | June 9, 1931 |
| 1,985,478 | Yuasa | Dec. 25, 1934 |
| 2,115,841 | Case | May 3, 1938 |
| 2,496,298 | Mackas | Feb. 7, 1950 |